United States Patent [19]

Etzbach et al.

[11] Patent Number: 5,216,139
[45] Date of Patent: Jun. 1, 1993

[54] THIOPHENEAZO DYE BASED ON A COUPLING COMPONENT OF THE THIAZOLE SERIES

[75] Inventors: Karl-Heinz Etzbach, Frankenthal; Guenter Hansen, Ludwigshafen; Gunther Lamm, Hassloch; Helmut Reichelt, Neustadt, all of Fed. Rep. of Germany

[73] Assignee: BASF Aktiengesellschaft, Ludwigshafen, Fed. Rep. of Germany

[21] Appl. No.: 620,457

[22] Filed: Dec. 4, 1990

Related U.S. Application Data

[63] Continuation of Ser. No. 407,282, Sep. 14, 1989, abandoned.

[30] Foreign Application Priority Data

Oct. 1, 1988 [DE] Fed. Rep. of Germany ....... 3833442

[51] Int. Cl.$^5$ .................. C09B 29/033; C09B 29/36; D06P 1/18
[52] U.S. Cl. .................................. 534/765; 534/573; 534/581; 534/582; 548/193; 549/71; 549/73; 8/536
[58] Field of Search ......................................... 534/765

[56] References Cited

U.S. PATENT DOCUMENTS

| | | | |
|---|---|---|---|
| 3,770,719 | 11/1973 | Fisher et al. | 534/765 |
| 4,619,992 | 10/1986 | Bergmann et al. | 534/765 X |
| 4,688,775 | 5/1987 | Bergmann et al. | 534/765 |

FOREIGN PATENT DOCUMENTS

| | | | |
|---|---|---|---|
| 0150034 | 7/1985 | European Pat. Off. | 549/68 |
| 169483 | 1/1986 | European Pat. Off. | 534/765 |
| 201896 | 11/1986 | European Pat. Off. | 534/765 |
| 0269953 | 6/1988 | European Pat. Off. | 534/765 |
| 3639942 | 6/1988 | Fed. Rep. of Germany | 534/765 |
| 2004561 | 4/1979 | United Kingdom | 534/765 |
| 2163768 | 3/1986 | United Kingdom | 534/765 |

Primary Examiner—Mary C. Lee
Assistant Examiner—Fiona T. Powers
Attorney, Agent, or Firm—Oblon, Spivak, McClelland, Maier & Neustadt

[57] ABSTRACT

Thiopheneazo dyes of the formula

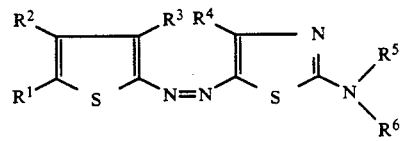

where
$R^1$ is cyano, $C_1$-$C_4$-alkoxycarbonyl, phenylazo, phenylsulfonyl, formyl or the radical

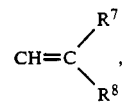

where $R^7$ and $R^8$ are independently of the other cyano or $C_1$-$C_4$-alkoxycarbonyl,
$R^2$ is $C_1$-$C_4$-alkyl, phenyl, halogen, $C_1$-$C_4$-alkoxy or $C_1$-$C_4$-alkoxycarbonyl, or $R^1$ and $R^2$ together are the radical $(CH_2)_3$—CO, which may be substituted by 1 or 2 methyl groups and whose carbonyl group is bonded to the thiophene ring in the ortho position relative to the sulfur atom,
$R^3$ is cyano or $C_1$-$C_4$-alkoxycarbonyl,
$R^4$ is $C_1$-$C_8$-alkyl, cyclohexyl, phenoxy-$C_1$-$C_4$-alkyl, substituted or unsubstituted phenyl, or substituted or unsubstituted thienyl,
$R^5$ is $C_1$-$C_4$-alkyl, $C_3$-$C_7$-alkyl whose alkyl chain is interrupted by 1 or 2 oxygen atoms, or $C_1$-$C_4$-alkoxy and
$R^6$ is cyanoethyl, phenylethyl or $C_3$-$C_{12}$-alkyl whose alkyl chain is interrupted by from 1 to 4 oxygen atoms and which may be substituted by phenyl or phenoxy,
with the proviso that, when $R^5$ and $R^6$ are each oxygen-interrupted alkyl, $R^6$ has 2 or more carbon atoms more than $R^5$, are used for dyeing textile fibers.

6 Claims, No Drawings

THIOPHENEAZO DYE BASED ON A COUPLING COMPONENT OF THE THIAZOLE SERIES

This application is a continuation of application Ser. No. 07/407,282, filed on Sep. 14, 1989, now abandoned.

The present invention relates to a novel thiopheneazo dye of the formula I

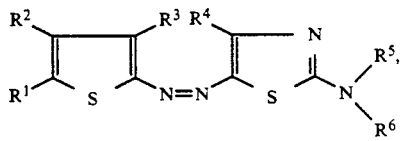

where $R^1$ is cyano, $C_1$-$C_4$-alkoxycarbonyl, phenylazo, phenylsulfonyl, formyl or the radical

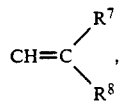

where $R^7$ and $R^8$ are identical or different and each is independently of the other cyano or $C_1$-$C_4$-alkoxycarbonyl, $R^2$ is $C_1$-$C_4$-alkyl, phenyl, halogen, $C_1$-$C_4$-alkoxy or $C_1$-$C_4$-alkoxycarbonyl, or $R^1$ and $R^2$ together are the radical $(CH_2)_3$—CO, which may be substituted by 1 or 2 methyl groups and whose carbonyl group is bonded to the thiophene ring in the ortho position relative to the sulfur atom, $R^3$ is cyano or $C_1$-$C_4$-alkoxycarbonyl, $R^4$ is $C_1$-$C_8$-alkyl, cyclohexyl, phenoxy-$C_1$-$C_4$-alkyl, substituted or unsubstituted phenyl, thienyl, $C_1$-$C_4$-alkylthienyl or halothienyl, $R^5$ is $C_1$-$C_4$-alkyl, $C_3$-$C_7$-alkyl whose alkyl chain is interrupted by 1 or 2 oxygen atoms, or $C_1$-$C_4$-alkoxy and $R^6$ is cyanoethyl, phenylethyl or $C_3$-$C_{12}$-alkyl whose alkyl chain is interrupted by from 1 to 4 oxygen atoms and which may be substituted by phenyl or phenoxy, with the proviso that, when $R^5$ and $R^6$ are each oxygen-interrupted alkyl, $R^6$ has 2 or more carbon atoms more than $R^5$, and to use thereof for dyeing textile fibers.

EP-A 269,953 already discloses azo dyes whose diazo components are derived from an aminothiophene and whose coupling components are derived from thiazole derivatives. However, it has been found that the compounds mentioned therein are defective in their application properties.

It is an object of the present invention to provide novel azo dyes based on a diazo component of the thiophene series and a coupling component of the thiazole series, which have an advantageous application profile.

We have found that this object is achieved by the thiopheneazo dye of the formula I defined at the beginning.

All the alkyl groups appearing in the abovementioned formula I can be not only straight-chain but also branched.

If substituted phenyl groups appear in the abovementioned formula I, suitable substituents are for example $C_1$-$C_4$-alkyl, $C_1$-$C_4$-alkoxy, halogen, in particular chlorine or bromine, $C_1$-$C_4$-alkanoylamino, sulfamoyl, $C_1$-$C_4$-monoalkylsulfamoyl or $C_1$-$C_4$-dialkylsulfamoyl, where the alkyl chain may be interrupted by an oxygen atom.

Suitable radicals $R^1$, $R^2$ and $R^3$ are for example methoxycarbonyl, ethoxycarbonyl, propoxycarbonyl, isopropoxycarbonyl, butoxycarbonyl or sec-butoxycarbonyl.

$R^1$ is also for example $CH{=}C(CN)_2$, $CH{=}C(CN)COOCH_3$, $CH{=}C(CN)COOC_2H_5$, $CH{=}C(COOCH_3)_2$ or $CH{=}C(COOC_2H_5)_2$.

$R^2$ is also for example, like $R^4$ and $R^5$, methyl, ethyl, propyl, isopropyl, butyl, isobutyl or sec-butyl.

$R^2$ is also for example, like $R^5$, methoxy, ethoxy, propoxy, isopropoxy, butoxy, isobutoxy or sec-butoxy.

$R^2$ is also for example chlorine or bromine.

$R^4$ is also for example pentyl, isopentyl, neopentyl, tert-pentyl, hexyl, isohexyl, heptyl, octyl, 2-ethylhexyl, phenoxymethyl, 2-phenoxyethyl, 2-, 3- or 4-methylphenyl, 2-, 3- or 4-methoxyphenyl, 2-, 3- or 4-chlorophenyl, 2,4-dichlorophenyl, 2-, 3- or 4-bromophenyl, 2-, 3- or 4-formylaminophenyl, 2-, 3- or 4-acetylaminophenyl, 3- or 4-sulfamoylphenyl, 3 1- or 4-monomethyl- or 3- or 4-dimethyl-sulfamoylphenyl or 3- or 4-[bis(2-methoxyethyl)sulfamoyl]phenyl.

$R^5$ is also for example, like $R^6$, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butyoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl or 4,7-dioxanonyl.

$R^6$ is also for example 2- or 4-butoxybutyl, 4,8-dioxadecyl, 3,6,9-trioxadecyl, 3,6,9-trioxaundecyl, 3,6,9,12-tetraoxatridecyl, 3,6,9,12-tetraoxatetradecyl, 3-benzyloxypropyl, 6-phenoxy-4-oxahexyl, 2-cyanoethyl or 2-phenylethyl.

Preference is given to a thiopheneazo dye of the formula I where only one of $R^1$, $R^2$ and $R^3$ is $C_1$-$C_4$-alkoxycarbonyl.

Particular preference is given to a thiopheneazo dye of the formula I where $R^1$ is cyano, $C_1$-$C_4$-alkoxycarbonyl or formyl, $R^2$ is $C_1$-$C_4$-alkyl or chlorine, $R^3$ is cyano, $R^4$ is phenyl, 2-thienyl or 3-thienyl, $R^5$ is $C_1$-$C_4$-alkyl and $R^6$ is $C_3$-$C_9$-alkyl whose alkyl chain is interrupted by from 1 to 3 oxygen atoms and which may be substituted by phenoxy.

In a particularly noteworthy thiopheneazo dye of the formula I, $R^6$ is $C_2H_4OCH_3$, $C_3H_6OCH_3$, $C_3H_6OC_2H_5$, $C_3H_6OC_2H_4OC_2H_5$, $C_3H_6OCH(CH_3)CH_2OCH_3$, $CH_2(C_2H_4O)_2CH_3$, $CH_2(C_2H_4O)_3CH_3$, $C_3H_6O(C_2H_4O)_2C_2H_5$ or $C_3H_6OC_2H_4OC_6H_5$.

The thiopheneazo dye according to the invention is prepared in a conventional manner. For example, a 2-aminothiophene of the formula II

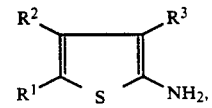

where $R^1$, $R^2$ and $R^3$ are each as defined above, can be diazotized and coupled with a thiazole of the formula III

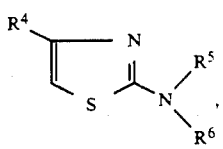

(III)

where R[4], R[5] and R[6] are each as defined above.

2-Aminothiophenes of the formula II are already known and described for example in EP-A-150,034 or can be obtained in similar fashion to the method of preparation described therein.

The thiazoles of the formula III are in general likewise known compounds. They are described for example in U.S. Pat. No. 3,770,719 and in J. V. Metzger, Heterocyclic Compounds—Thiazole and its Derivatives, vol. 34, part 1, Interscience Publishers, John Wiley, New York, 1979, or can be obtained in similar fashion to the methods described therein.

Further details of the preparation of the dye according to the invention may be found in the Examples.

In general, a thiopheneazo dye of the formula I where R[5] and R[6] together have 4 or more oxygen atoms is liquid at room temperature.

The novel thiopheneazo dye of the formula I is advantageously suitable for use as a disperse dye for dyeing textile fibers, in particular cellulose esters or polyesters, but also polyamides or blend fabrics from polyesters and cellulose fibers.

The dyeings obtained have good fastness properties, in particular good light fastness and good fastness to dry heat setting and pleating. The novel dye has good migration properties.

To obtain a favorable color buildup, it can be advantageous in some cases to use a mixture of more than one dye of the formula I according to the invention for dyeing.

The Examples which follow will illustrate the invention in more detail.

EXAMPLE 1

18.7 g of 2-amino-3-cyano-4-chloro-5-formylthiophene where introduced into a 0° C. mixture of 111 g of 80% strength by weight sulfuric acid, 15 ml of glacial acetic acid and 32 g of 42% strength by weight nitrosylsulfuric acid. This was followed by stirring at 0°–5° C. for 4 hours. The diazonium salt solution was then added to a mixture at 0° C. prepared from 36 4 g of a coupling component of the formula

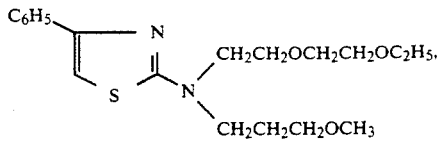

200 g of glacial acetic acid, 40 g of propionic acid and 30 ml of 10% strength by weight amidosulfuric acid solution. After the two solutions had been combined, about 160 g of ice were added, and the mixture was then buffered with sodium acetate solution (about 30% strength by weight) to pH 0.2–0.7. The dye formed was then precipitated in full by the addition of water, filtered off with suction, washed until neutral and dried. This gave 52 g of dark blue powder of the formula

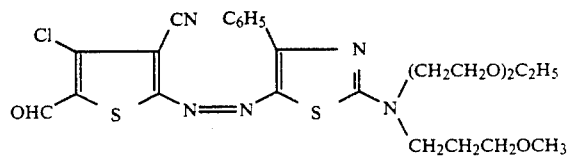

The dye forms a blue solution in acetone and dyes polyethylene terephthalate fabric in bright medium blue shades of excellent buildup potential. The dyeings have high light fastness properties and a high fastness to dry heat setting and pleating. $\lambda_{max}$: 604 nm (9:1 v/v N,N-dimethylformamide/glacial acetic acid).

EXAMPLE 2

A mixture of 110 g of 80% strength by weight sulfuric acid, 15 g of glacial acetic acid and 32 g of 42% strength by weight nitrosylsulfuric acid was cooled down to 0° C. 21 g of ethyl 2-amino-3-cyano-4-methylthiophene-5-carboxylate were then sprinkled in with thorough stirring and cooling at such a rate that the reaction temperature was maintained at 0°–5° C. Stirring for 3–4 hours gave a clear diazonium salt solution. It was added to a solution prepared from 36.4 g of the coupling component of the formula

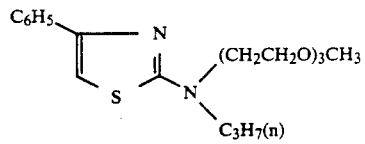

in 15 ml of concentrated hydrochloric acid, 350 ml of water and 0.5 g of an acidic dispersant. Before the diazonium salt solution was added, 300 g of ice were added to bring the temperature down to ≦0° C., and 1 g of amidosulfuric acid was added. At the same time as the diazonium salt solution water and ice were added in such a way that the coupling mixture stayed stirrable and does not exceed 5° C. The mixture was subsequently stirred for 15 minutes, the pH of the suspension was then raised to 0.5–0.8 by the addition of ice-cold dilute sodium hydroxide solution, and the product obtained was isolated as described in Example 1. This gave 57.5 g of violet powder of the formula

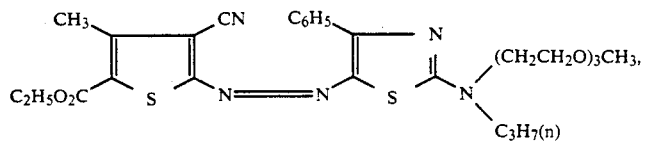

which gives a reddish blue solution in acetone and dyes polyester fabric in light-fast, deep reddish blue to navy shades. $\lambda_{max}$: 576 nm (9:1 v/v N,N-dimethylformamide/glacial acetic acid).

The dyes listed in the tables below are obtained in a similar manner.

TABLE 1

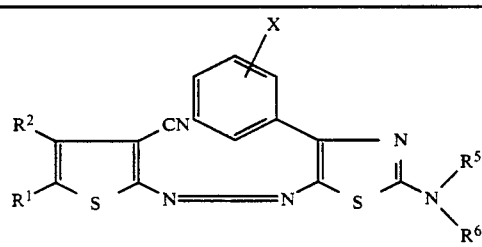

| Ex. No. | $R^1$ | $R^2$ | X | $R^5$ | $R^6$ | Hue |
|---|---|---|---|---|---|---|
| 3 | CN | $CH_3$ | H | $CH_3$ | $C_3H_6OC_2H_4OCH_3$ | reddish blue |
| 4 | CN | $CH_3$ | H | $C_2H_5$ | $C_3H_6OC_2H_4OCH_3$ | reddish blue |
| 5 | CN | $CH_3$ | p-$OCH_3$ | $C_2H_5$ | $C_3H_6OC_2H_4OCH_3$ | navy |
| 6 | CN | $CH_3$ | H | $C_2H_5$ | $(C_2H_4O)_2CH_3$ | reddish blue |
| 7 | CN | $CH_3$ | H | $C_2H_5$ | $(C_2H_4O)_3CH_3$ | reddish blue |
| 8 | CN | $CH_3$ | H | $C_2H_5$ | $(C_2H_4O)_2C_2H_5$ | navy |
| 9 | CN | $CH_3$ | H | $C_2H_5$ | $(C_2H_4O)_3C_2H_5$ | navy |
| 10 | CN | $CH_3$ | m-Cl | $C_2H_5$ | $(C_2H_4O)_2CH_3$ | reddish blue |
| 11 | CN | $CH_3$ | p-Cl | $C_2H_5$ | $(C_2H_4O)_2CH_3$ | reddish blue |
| 12 | CN | $CH_3$ | m-$SO_2N(CH_3)_2$ | $C_2H_5$ | $(C_2H_4O)_2CH_3$ | reddish blue |
| 13 | CN | $CH_3$ | m-$SO_2N(CH_3)_2$ | $C_2H_5$ | $(C_2H_4O)_3CH_3$ | reddish blue |
| 14 | CN | $CH_3$ | p-$OCH_3$ | $C_2H_5$ | $(C_2H_4O)_2C_2H_5$ | reddish blue |
| 15 | $CO_2CH_3$ | $CH_3$ | H | $C_2H_5$ | $(C_2H_4O)_2C_2H_5$ | bluish violet |
| 16 | $CO_2C_2H_5$ | $CH_3$ | H | $C_2H_5$ | $(C_2H_4O)_2CH_3$ | bluish violet |
| 17 | CN | Cl | H | $C_2H_5$ | $(C_2H_4O)_2CH_3$ | navy |
| 18 | CN | Cl | H | $C_2H_5$ | $(C_2H_4O)_2C_2H_5$ | navy |
| 19 | CN | Cl | H | $C_3H_6OCH_3$ | $(C_2H_4O)_2C_2H_5$ | navy |
| 20 | CN | H | H | $C_3H_6OCH_3$ | $(C_2H_4O)_2C_2H_5$ | reddish blue |
| 21 | CHO | H | H | $C_3H_6OCH_3$ | $(C_2H_4O)_2C_2H_5$ | blue |
| 22 | CHO | H | H | $C_2H_5$ | $(C_2H_4O)_2C_2H_5$ | blue |
| 23 | CN | $C_2H_5$ | H | $C_2H_5$ | $(C_2H_4O)_2CH_3$ | reddish blue |
| 24 | CHO | Cl | H | $C_2H_5$ | $(C_2H_4O)_2CH_3$ | blue |
| 25 | CHO | Cl | H | $C_2H_5$ | $(C_2H_4O)_2C_2H_5$ | blue |
| 26 | CHO | Cl | H | $C_2H_5$ | $(C_2H_4O)_3CH_3$ | blue |
| 27 | CHO | Cl | H | $C_2H_5$ | $(C_2H_4O)_3C_2H_5$ | blue |
| 28 | CHO | Cl | H | $C_3H_7(n)$ | $(C_2H_4O)_2CH_3$ | blue |
| 29 | CHO | Cl | H | $C_2H_5$ | $C_3H_6OC_2H_4OCH_3$ | blue |
| 30 | CHO | Cl | H | $C_2H_5$ | $C_3H_6OC_2H_4OC_2H_5$ | blue |
| 31 | CHO | Cl | H | $CH_3$ | $C_3H_6OC_2H_4OC_2H_5$ | blue |
| 32 | CHO | Cl | H | $CH_3$ | $C_3H_6OC_2H_4OCH_3$ | blue |
| 33 | CHO | Cl | H | $CH_3$ | $(C_2H_4O)_3C_2H_5$ | blue |
| 34 | CHO | Cl | H | $C_3H_7(n)$ | $(C_2H_4O)_3CH_3$ | blue |
| 35 | CHO | Cl | H | $C_2H_4OC_4H_9(n)$ | $(C_2H_4O)_3C_2H_5$ | blue |
| 36 | CHO | Cl | H | $C_2H_4OCH_3$ | $(C_2H_4O)_2C_2H_5$ | blue |
| 37 | CHO | Cl | H | $C_3H_6OC_3H_7$ | $(C_2H_4O)_3C_2H_5$ | blue |
| 38 | CHO | Cl | H | $C_2H_4OC_2H_5$ | $(C_2H_4O)_2C_2H_5$ | blue |
| 39 | CHO | Cl | H | $C_3H_6OC_2H_5$ | $(C_2H_4O)_3C_2H_5$ | blue |
| 40 | CHO | Cl | H | $C_3H_6OC_2H_5$ | $(C_2H_4O)_3CH_3$ | blue |
| 41 | CHO | Cl | H | $CH(CH_3)_2$ | $(C_2H_4O)_2CH_3$ | blue |
| 42 | CHO | Cl | m-$SO_2N(CH_3)_2$ | $C_2H_5$ | $(C_2H_4O)_2CH_3$ | blue |
| 43 | CHO | Cl | m-$SO_2N(C_2H_4OCH_3)_2$ | $C_2H_5$ | $(C_2H_4O)_2CH_3$ | blue |
| 44 | CHO | Cl | m-Cl | $C_2H_5$ | $(C_2H_4O)_2CH_3$ | blue |
| 45 | CHO | Cl | p-Cl | $C_2H_5$ | $(C_2H_4O)_2CH_3$ | blue |
| 46 | CHO | Cl | p-Cl | $C_2H_5$ | $(C_2H_4O)_3CH_3$ | blue |
| 47 | CH=C(CN)($CO_2C_2H_5$) | Cl | H | $C_2H_5$ | $(C_2H_4O)_2CH$ | greenish blue |

TABLE 1-continued

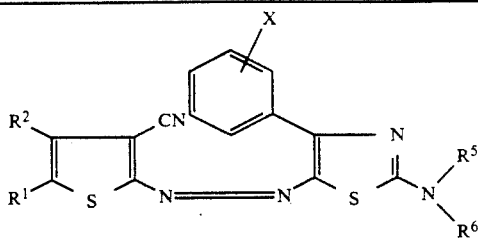

| Ex. No. | R¹ | R² | X | R⁵ | R⁶ | Hue |
|---|---|---|---|---|---|---|
| 48 | CH=C(CN)(CN) | Cl | H | $C_2H_5$ | $(C_2H_4O)_3C_2H_5$ | greenish blue |

TABLE 2

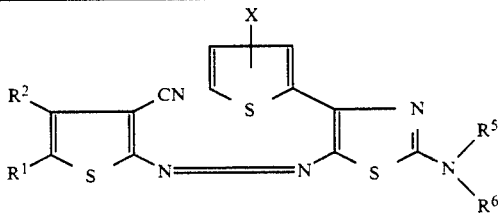

| Ex. No. | R¹ | R² | X | R⁵ | R⁶ | Hue |
|---|---|---|---|---|---|---|
| 49 | CN | $CH_3$ | H | $CH_3$ | $C_3H_6OC_2H_4OCH_3$ | blue |
| 50 | CN | $CH_3$ | H | $C_2H_5$ | $C_3H_6OC_2H_4OCH_3$ | blue |
| 51 | CN | $CH_3$ | H | $C_2H_5$ | $C_3H_6OC_2H_4OCH_3$ | blue |
| 52 | CN | $CH_3$ | H | $C_2H_5$ | $(C_2H_4O)_2CH_3$ | blue |
| 53 | CN | $CH_3$ | H | $C_2H_5$ | $(C_2H_4O)_3CH_3$ | blue |
| 54 | CN | $CH_3$ | H | $C_2H_5$ | $(C_2H_4O)_2C_2H_5$ | blue |
| 55 | CN | $CH_3$ | H | $C_2H_5$ | $(C_2H_4O)_3C_2H_5$ | blue |
| 56 | CN | $CH_3$ | H | $C_2H_5$ | $(C_2H_4O)_2CH_3$ | blue |
| 57 | CN | $CH_3$ | H | $C_3H_7$ | $(C_2H_4O)_2CH_3$ | blue |
| 58 | CN | $CH_3$ | H | $C_2H_5$ | $(C_2H_4O)_3CH_3$ | blue |
| 59 | CN | $CH_3$ | H | $C_3H_7$ | $(C_2H_4O)_3CH_3$ | blue |
| 60 | CN | $CH_3$ | H | $C_2H_5$ | $(C_2H_4O)_2C_2H_5$ | blue |
| 61 | $CO_2CH_3$ | $CH_3$ | H | $C_2H_5$ | $(C_2H_4O)_3C_2H_5$ | blue |
| 62 | $CO_2C_2H_5$ | $CH_3$ | H | $C_2H_5$ | $(C_2H_4O)_2CH_3$ | blue |
| 63 | CN | $CH_3$ | H | $C_2H_5$ | $(C_2H_4O)_3C_2H_5$ | blue |
| 64 | CHO | Cl | H | $C_3H_6OC_2H_5$ | $(C_2H_4O)_3C_2H_5$ | bluish green |
| 65 | CN | Cl | H | $C_2H_5$ | $(C_2H_4O)_2C_2H_5$ | blue |
| 66 | CN | Cl | H | $C_3H_6OCH_3$ | $(C_2H_4O)_2C_2H_5$ | blue |
| 67 | CN | $C_6H_5$ | H | $C_3H_6OCH_3$ | $(C_2H_4O)_2C_2H_5$ | blue |
| 68 | CHO | H | H | $C_3H_6OCH_3$ | $(C_2H_4O)_3CH_3$ | greenish blue |
| 69 | CHO | H | H | $C_2H_5$ | $(C_2H_4O)_3CH_3$ | greenish blue |
| 70 | CN | $C_2H_5$ | H | $C_2H_5$ | $(C_2H_4O)_2CH_3$ | blue |
| 71 | CHO | Cl | H | $C_2H_5$ | $(C_2H_4O)_2CH_3$ | turquoise |
| 72 | CHO | Cl | H | $C_2H_5$ | $(C_2H_4O)_2C_2H_5$ | bluish green |
| 73 | CHO | Cl | H | $C_2H_5$ | $(C_2H_4O)_3CH_3$ | bluish green |
| 74 | CHO | Cl | H | $C_2H_5$ | $(C_2H_4O)_3C_2H_5$ | bluish green |
| 75 | CHO | Cl | H | $C_3H_7(n)$ | $(C_2H_4O)_2CH_3$ | bluish green |
| 76 | CHO | Cl | H | $C_2H_5$ | $C_3H_6OC_2H_4OCH_3$ | bluish green |
| 77 | CHO | Cl | H | $C_2H_5$ | $C_3H_6OC_2H_4OC_2H$ | bluish green |
| 78 | CHO | Cl | H | $CH_3$ | $C_3H_6OC_2H_4OC_2H_5$ | bluish green |
| 79 | CHO | Cl | $2-CH_3$ | $CH_3$ | $C_3H_6OC_2H_4OCH_3$ | bluish green |
| 80 | CHO | Cl | H | $C_2H_5$ | $(C_2H_4O)_3C_2H_5$ | bluish green |
| 81 | CHO | Cl | H | $C_3H_7(n)$ | $(C_2H_4O)_3CH_3$ | bluish green |
| 82 | CHO | Cl | H | $C_2H_4OC_4H_9(n)$ | $(C_2H_4O)_3C_2H_5$ | bluish green |
| 83 | CHO | Cl | H | $C_2H_4OCH_3$ | $(C_2H_4O)_2C_2H_5$ | bluish green |
| 84 | CHO | Cl | H | $C_2H_4OC_3H_7(n)$ | $(C_2H_4O)_3C_2H_5$ | bluish green |
| 85 | CHO | Cl | H | $C_2H_4OC_2H_5$ | $(C_2H_4O)_2C_2H_5$ | bluish green |
| 86 | CHO | Cl | H | $C_3H_6OC_2H_5$ | $(C_2H_4O)_3CH_3$ | bluish green |
| 87 | CHO | Cl | H | $C_2H_4OC_2H_5$ | $(C_2H_4O)_3CH_3$ | bluish green |
| 88 | CHO | Cl | H | $CH(CH_3)_2$ | $(C_2H_4O)_2CH_3$ | bluish green |
| 89 | CHO | Cl | H | $C_2H_5$ | $(C_2H_4O)_2CH_3$ | bluish green |
| 90 | CHO | Cl | H | $C_3H_6OC_3H_7(n)$ | $(C_2H_4O)_3C_2H_5$ | turquoise |
| 91 | CHO | Cl | H | $C_3H_7$ | $(C_2H_4O)_2CH_3$ | turquoise |
| 92 | CHO | $OC_2H_5$ | H | $C_2H_5$ | $(C_2H_4O)_2CH_3$ | turquoise |
| 93 | CHO | $OC_2H_5$ | H | $C_3H_7(n)$ | $(C_2H_4O)_2CH_3$ | turquoise |
| 94 | CHO | H | H | $C_3H_7$ | $(C_2H_4O)_3CH_3$ | bluish green |
| 95 | $CO_2CH_3$ | $CH_3$ | H | $C_2H_5$ | $(C_2H_4O)_3CH_3$ | blue |

TABLE 2-continued

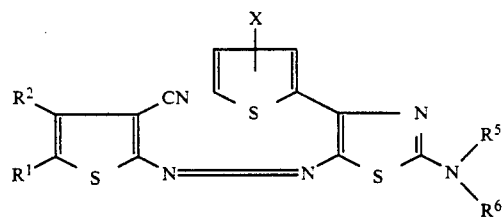

| Ex. No. | R¹ | R² | X | R⁵ | R⁶ | Hue |
|---|---|---|---|---|---|---|
| 96 | CO₂CH₃ | C₂H₅ | H | C₂H₅ | (C₂H₄O)₃CH₃ | blue |

TABLE 3

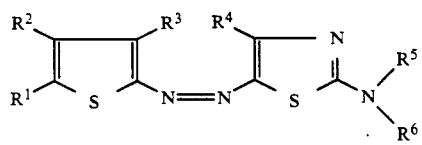

| Ex. No. | R¹ | R² | R³ | R⁴ | R⁵ | R⁶ | Hue |
|---|---|---|---|---|---|---|---|
| 97 | CH₃O₂C | CH₃ | CN | ![thiophene] | C₄H₈OCH₃ | (C₂H₄O)₃C₂H₅ | blue |
| 98 | C₆H₅-N=N- | H | CN | C₆H₅ | C₃H₆OCH₃ | (C₂H₄O)₃CH₃ | blue |
| 99 | C₂H₅O₂C | C₂H₅O₂C | CN | C₆H₅ | C₃H₇(n) | C₃H₆OC₂H₅ | reddish blue |
| 100 | C₂H₅O₂C | C₂H₅ | CN | ![thiophene] | C₃H₇(n) | C₃H₆OC₂H₅ | blue |
| 101 | CN | CH₃ | CN | C₆H₅ | C₃H₇(n) | (C₂H₄O)₂CH₃ | reddish blue |
| 102 | CN | CH₃ | CN | C₆H₅ | C₃H₇(l) | (C₂H₄O)₂CH₃ | reddish blue |
| 103 | CN | CH₃ | CN | C₆H₅ | C₄H₉(n) | (C₂H₄O)₂CH₃ | reddish blue |
| 104 | CN | CH₃ | CN | ![thiophene] | C₃H₇(n) | (C₂H₄O)₂CH₃ | blue |
| 105 | CN | CH₃ | CN | ![thiophene] | C₃H₇(n) | C₃H₆OCH₂CH₂<br>                            OCH₃ | blue |
| 106 | C₂H₅O₂C | C₂H₅O₂C | CN | C₆H₅ | C₂H₄OC₃H₇(n) | C₃H₆OC₂H₄OC₂H₅ | reddish blue |
| 107 | C₂H₅O₂C | CH₃ | CO₂C₂H₅ | C₆H₅ | C₂H₄OC₄H₉(n) | C₃H₆OC₃H₄OC₂H₅ | violet |
| 108 | C₂H₅O₂C | CH₃ | CO₂C₂H₅ | C₆H₅ | C₃H₇(n) | C₃H₆OC₂H₅ | violet |
| 109 | CHO | CH₃ | CN | C₆H₅ | C₂H₅ | C₂H₄OC₂H₄OCH₃ | blue |
| 110 | CHO | CH₃ | CN | C₆H₅ | C₂H₅ | (C₂H₄O)₃C₂H₅ | blue |
| 111 | CHO | CH₃ | CN | C₆H₅ | C₃H₆OCH₃ | (C₂H₄O)₂C₂H₅ | blue |

TABLE 4

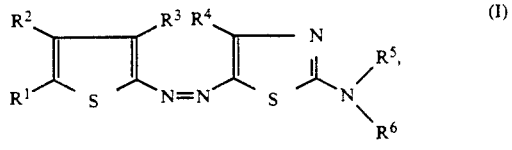

| Ex. No. | $L^1$ | $L^2$ | $L^3$ | $\lambda_{max}$ [nm] |
|---|---|---|---|---|
| 112 | $CO_2CH_3$ | $CH_3$ | (thienyl) | 580 |
| 113 | $CO_2CH_3$ | $CH_3$ | (methylthienyl) | 594 |
| 114 | CHO | Cl | (thienyl) | 638 |
| 115 | CHO | Cl | (methylthienyl) | 592 |
| 116 | CHO | Cl | $C_6H_5$ | 606 |
| 117 | CN | $CH_3$ | (methylthienyl) | 609 |

We claim:

1. A thiopheneazo dye of the formula I $$\text{(I)}$$

where
$R^1$ is cyano or formyl,
$R^2$ is methyl, phenyl or chlorine,
$R^3$ is cyano,
$R^4$ is $C_1$–$C_8$-alkyl, cyclohexyl, phenoxy-$C_1$–$C_4$-alkyl;, unsubstituted phenyl or thienyl,
$R^5$ is $C_1$–$C_4$-alkyl, $C_3$–$C_7$-alkyl whose alkyl chain is interrupted by 1 or 2 oxygen atoms, each oxygen atom being attached to only a carbon atom, or $C_1$–$C_4$-alkoxy and
$R^6$ is phenylethyl, or $C_3$–$C_{12}$-alkyl whose alkyl chain is interrupted by from 1 to 4 oxygen atoms, each oxygen atom being attached to only a carbon atom, or said interrupted $C_3$–$C_{12}$-alkyl substituted by phenyl or phenoxy,
with the proviso that, when $R^5$ and $R^6$ are each oxygen-interrupted alkyl, $R^6$ has 2 or more carbon atoms more than $R^5$.

2. A thiophene dye as claimed in claim 1, wherein $R^6$ is methoxyethyl, methoxypropyl or 3,5-dioxaoctyl.

3. A thiophene dye as claimed in claim 2, wherein $R^1$ is formyl and $R^2$ is methyl or phenyl.

4. A thiophene dye as claimed in claim 1, wherein $R^1$ is formyl and $R^2$ is methyl or phenyl.

5. A thiopheneazo dye as claimed in claim 1, wherein
$R^2$ is methyl or chlorine,
$R^3$ is cyano,
$R^4$ is phenyl, 2-thienyl or 3-thienyl,
$R^5$ is $C_1$–$C_4$-alkyl and
$R^6$ is $C_3$–$C_9$-alkyl whose alkyl chain is interrupted by from 1 to 3 oxygen atoms, or said interrupted $C_3$–$C_9$-alkyl substituted by phenoxy.

6. A method of dyeing textile fibers comprising applying thereto a thiopheneazo dye as claimed in claim 1.

* * * * *